United States Patent [19]

Druckenbrodt et al.

[11] 4,235,740
[45] Nov. 25, 1980

[54] METHOD FOR THE MANUFACTURE OF $(U,PU)O_2$ MIXED CRYSTALS

[75] Inventors: Wolf-Günther Druckenbrodt, Aachen; Siegfried Baumann, Karlstein; Roland Krause, Alzenau; Wolfgang Stoll, Hanau, all of Fed. Rep. of Germany

[73] Assignee: Alkem GmbH, Hanau, Fed. Rep. of Germany

[21] Appl. No.: 20,012

[22] Filed: Mar. 13, 1979

[30] Foreign Application Priority Data

Mar. 18, 1978 [DE] Fed. Rep. of Germany ....... 2811959

[51] Int. Cl.² .................. C01G 56/00; G21C 3/62
[52] U.S. Cl. .......................... 252/301.1 R; 176/89; 423/251
[58] Field of Search ................. 423/251, 15; 252/301.1 R; 176/89

[56] References Cited

U.S. PATENT DOCUMENTS

| | | | |
|---|---|---|---|
| 2,843,453 | 7/1958 | Connick et al. | 423/251 |
| 2,868,707 | 1/1959 | Alter et al. | 252/301.1 R |
| 3,287,279 | 11/1966 | Lyon | 423/15 |
| 3,804,772 | 4/1974 | Lane et al. | 252/301.1 R |
| 3,976,775 | 8/1976 | Tallent | 252/301.1 R |

*Primary Examiner*—Benjamin R. Padgett
*Assistant Examiner*—Deborah L. Kyle
*Attorney, Agent, or Firm*—Herbert L. Lerner

[57] ABSTRACT

Manufacture of uranium/plutonium oxide mixed crystals soluble in nitric acid in which a solution of uranium nitrate and plutonium nitrate are oxidized to cause the plutonium to reach valence VI. The oxidized solution is admixed with ammonium carbonate, oxalate or carbamate and the pH adjusted to 8.1 to 8.5 to precipitate an ammonium uranyl plutonyl carbonate, oxalate or carbamate. The precipitate is calcined to uranium/plutonium oxide.

17 Claims, 1 Drawing Figure

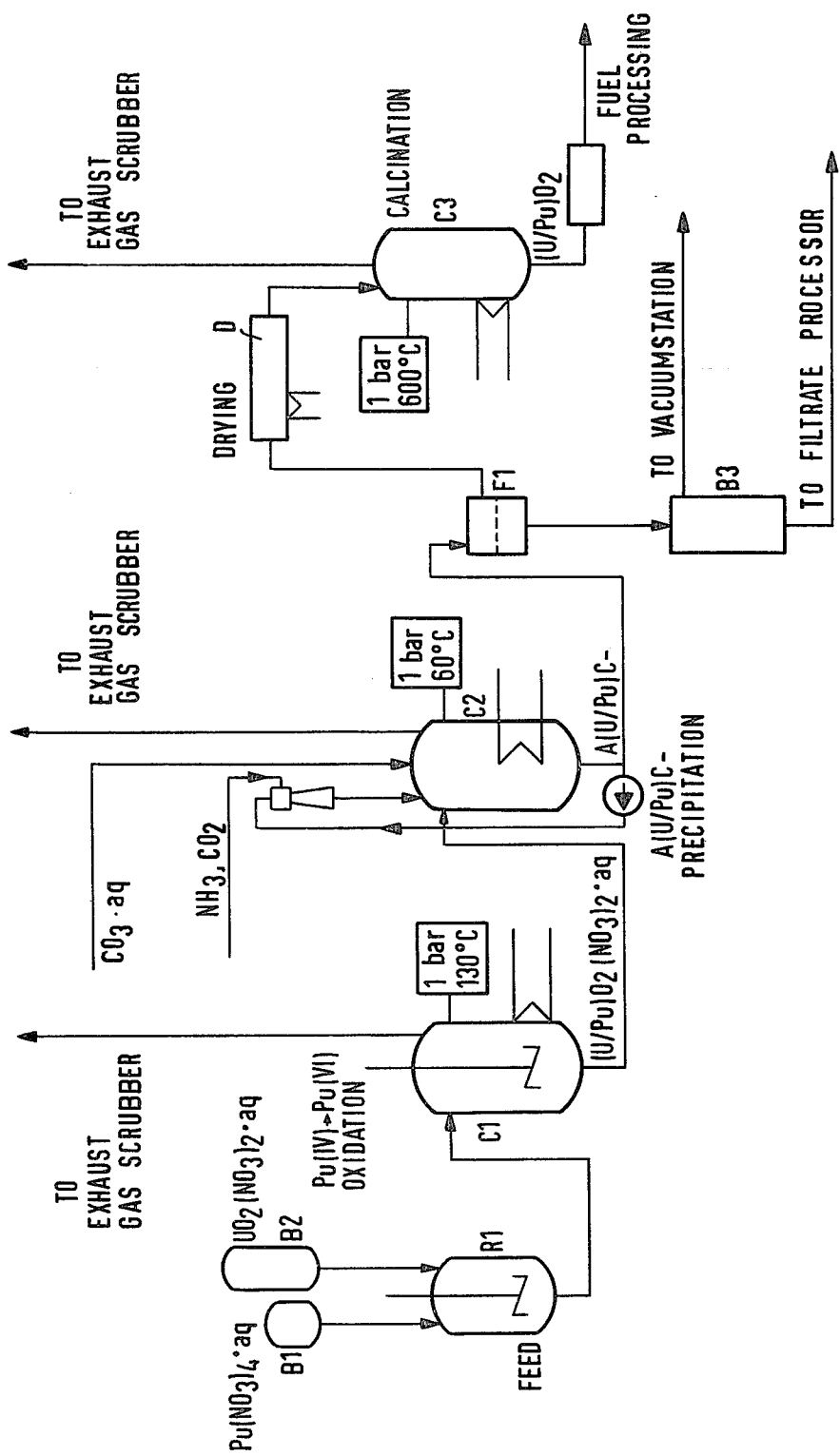

METHOD FOR THE MANUFACTURE OF (U,PU)O₂ MIXED CRYSTALS

BACKGROUND OF THE INVENTION

1. Field of the Invention

The present invention relates to a method for the manufacture of $(U,Pu)O_2$ mixed crystals as a preliminary stage for the fabrication of sintered nuclear fuel bodies with uranium- and plutonium-containing raw materials.

2. Background of the Invention

The nuclear fuel bodies are generally in pellet form and are customarily inserted into cladding tubes which then serve as fuel rods for the construction of fuel assemblies. These fuel assemblies serve for the generation of energy in the core of nuclear reactors, which usually operate according to the principle of thermal reactors or of fast breeder reactors. In these nuclear reactors, plutonium is formed in the nuclear fuel during the burnup of the fuel assemblies, which is recovered in reprocessing plants, and can and must be reused as nuclear fuel.

To achieve uniform heat production over the entire length of the fuel rods or, in other words, to avoid overheated places in the fuel rods of the core, it is necessary to mix uranium dioxide and plutonium dioxide so intimately that a completely homogeneous distribution of the fissionable materials be obtained. The ideal solution is to use uranium and plutonium as mixed crystals. At the same time it is necessary, especially for ecological and also economic reasons, to recover as much of the plutonium formed or employed as possible from the burned-up fuel assemblies. To this end, high solubility of the fuel employed in nitric acid is necessary, because the use of hydrofluoric acid as the solvent, which is required if the solubility is low, creates problems due to the highly corrosive character of such media. In the interest of plutonium processing for the manufacture of nuclear fuel, high solubility of all products obtained in nitric is also desirable. This desired solubility, however, can be achieved only if uranium and plutonium are present in mixed crystal form.

The chemical attempts for solving the problems up to now have been the joint precipitation of ADU (ammonium diuranate) and $Pu(OH)_4$. However, the product so obtained in the precipitate is not mixed crystals but only a thorough dispersion of the plutonium precipitate in an ADU matrix. With this method, an agglomeration of $Pu(OH)_4$ and the formation of product components insoluble in nitric acid can not always be avoided, however. Furthermore, the separation of impurities by this process is very incomplete.

In another precipitation process for uranium and plutonium of the peroxide precipitation type, the precipitate can be filtered adequately only at low temperatures ($\leq +6°$ C.) and has a tendency toward explosive decomposition under certain conditions. The $(U/Pu)O_2$ powder which can be made from the precipitate has poor sintering properties and therefore requires very extensive further processing.

In these mentioned joint precipitation processes for uranium and plutonium, which have been tried on a technical scale, these substances are present in different oxidation stages, so that the ideal precipitation conditions for both elements are distinctly different. This means that a compromise must always be made between the chemical behavior of the two elements at the different oxidation stages.

In the journal "Radiochimica Acta", vol. 11, year '69, pages 123 to 127, the proposal was made in an article by C. Keller to obtain carbonate complexes by reducing uranium and plutonium to the 4-valent oxidation stage in a soda solution, which, after precipitation, can be annealed to form a homogeneous $(U/Pu)O_2$ nuclear fuel that can be sintered. The reduction was performed electrolytically. These investigations, however, never got beyond the laboratory stage and have been abandoned.

All attempts to solve the problems of homogeneity and solubility of plutonium-containing nuclear fuels by mechanical means involve process-wise very expensive repeated milling and sintering steps. With milling processes, one must furthermore always reckon with abrasion in the mills, which leads to powder highly loaded with impurities.

SUMMARY OF THE INVENTION

With the foregoing and other objects in view, there is provided in accordance with the invention a method for the manufacture of uranium-plutonium oxide mixed crystals soluble in 10 molar nitric acid as a preliminary stage for the fabrication of sintered nuclear fuel bodies with uranium-and plutonium-containing materials, which comprises (a) oxidizing a mixture of uranyl nitrate and plutonium nitrate in aqueous solution to cause the plutonium to reach a stage of oxidation with a valence VI, (b) admixing the oxidized solution with an aqueous solution of a salt selected from the group consisting of ammonium carbonate, ammonium oxalate and ammonium carbamate and adjusting the pH of the admixture to 8.1–8.5 by adding $NH_3$ as well as $CO_2$ while maintaining a temperature of about 45° to 60° C. to precipitate an ammonium uranyl plutonyl carbonate, oxalate or carbonate depending on the use of the particular salt selected from the group consisting of ammonium carbonate, ammonium oxalate and ammonium carbamate, (c) calcining the precipitate in a reducing atmosphere at about 300°–700° C. to produce a uranium-plutonium oxide, and (d) adjusting the uranium-plutonium oxide to a desired oxygen/metal ratio.

In accordance with the invention there is provided a method of producing compounds having the general formula

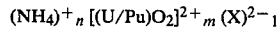

wherein X represents a member of the group consisting of $CO_3$, $(COO)_2$ and $NH_2COO$, and wherein n is a numeral from 0 to 6, m means one of the numbers one and two, and i is a numeral from 1 to 5, which comprises admixing a solution of uranyl nitrate and plutonium nitrate with the plutonium oxidized to valence VI, with a salt selected from the group consisting of ammonium carbonate, ammonium oxalate and ammonium carbamate to produce a precipitate having said formula, and separating said precipitate.

There is provided in accordance with the invention a method of producing compounds having the formula

wherein X represents a member of the group consisting of $CO_3$, $(COO)_2$ and $NH_2COO$, and wherein n is a numeral from 0 to 4, which comprises admixing a solution of uranyl nitrate and plutonium nitrate with the plutonium oxidized to valence VI, with a salt selected from the group consisting of ammonium carbonate, ammonium oxalate and ammonium carbamate, maintaining a temperature of about 45° to 60° C. and a pH of 8.1 to 8.5 to produce a precipitate having said formula, and separating said precipitate.

Other features which are considered as characteristic for the invention are set forth in the appended claims.

Although the invention is illustrated and described herein as embodied in a method for the manufacture of $(U,Pu)O_2$ mixed crystals, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing, which diagrammatically illustrates one method of carrying out the present invention, whereby the U/Pu oxide may also be in a non-stochiometric state.

DETAILED DESCRIPTION OF THE INVENTION

In accordance with the invention, a uranyl nitrate and a plutonium nitrate solution were mixed and oxidized until both metals have reached the valence VI. This mixture of uranyl nitrate and plutonium nitrate solution was gradually added, for instance, to a 20-% solution of $(NH_4)_2CO_3$. Simultaneously, $NH_3$ for adjusting a pH value of 8.1 to 8.5 and $CO_2$ are fed in. The end product $(NH_4)_4[(U,Pu)O_2](CO_3)_3$ is precipitated at temperatures of 45° to 60° C. The starting solution is advantageously oxidized by overheating, i.e. heating at an elevated temperature to cause oxidation of the metals to a higher valence stage, and boiling down, i.e. concentrating the solution by evaporation, at 135° to 150° C. However, it is also possible to perform the oxidation electrolytically or by means of oxidants such as AgO or $O_3$. However, the overheating fits naturally into the rest of the process and requires no additional chemical substances of any kind.

To further illustrate the method according to the invention, reference is made to the attached drawing showing a flow diagram of the process, which will be explained by way of an example:

The starting solutions from the tank $B_1$ which contains an aqueous solution of $Pu(NO_3)_4$, and the tank $B_2$ which contains an aqueous solution of $UO_2(NO_3)_2$, are mixed in the stirring tank $R_1$.

A uranyl nitrate and a plutonium nitrate solution from feed tank $B_1$ is fed into a chemical reactor $C_1$, which is equipped with a heater system as well as with conventional temperature-, level measuring and density measuring devices. Instead of starting out with two separate nitrate solutions, an available mixed solution, i.e., a U/Pu-nitrate solution, can also be fed into the chemical reactor $C_1$.

So that all plutonium concentration requirements in the later nuclear fuel can be covered (also for the fast breeder fuel), a uranium-to-plutonium ratio of, for instance, 7:3 is chosen.

This means at the same time that no excessive product increase which must be processed under plutonium conditions, is brought about by the high plutonium content. For producing light-water reactor fuels, $UO_2$ can be admixed to the so produced $(U/Pu)O_2$-powder later without adverse effects on the quality and solubility of the mixture.

By means of a heating device in the reactor $C_1$, local overheating of the uranyl nitrate and plutonium nitrate solution to at least 135° to 150° C. is achieved. During the heating, water and dissolved nitrogen oxides are evaporated, but by controlling the cooling in the head of the reactor, a large reflux ratio of the evaporating nitric acid is set thereby retarding and regulating the rate of evaporation. The reactor $C_1$ is run so that after a time of about 12 hours, a metal concentration of about 400 g per liter is reached in the solution. During this period, more than 99% of the plutonium is converted into the 6-valent oxidation stage. At the same time, the amount of free nitric acid has been reduced from, for instance, 5 molar to contents of 1 molar or less than 1 molar.

The so prepared feed solution in chemical reactor $C_1$ is metered into a precipitation tank $C_2$ into which has been fed a 20% ammonium carbonate solution $(NH_4)_2CO_3$. The precipitation tank is temperature stabilized to 45° to 60° C. by means of a heating and cooling system which is controlled by a thermostat. The quantity of the ammonium carbonate solution and the U/Pu nitrate solution fed into tank $C_2$ is matched to obtain a final metal concentration of 100 to 200 g per liter and in particular, of 130 g per liter in the tank. The solution is continuously circulated by a pump, and $CO_2$ and $NH_3$ are introduced at the same time.

The $NH_3$-gas stream is regulated via a conventional pH-measuring device and a valve controlled thereby. The regulation is tuned so that a pH-value between 8.1 and 8.5 is maintained continuously. The $CO_2$-gas stream corresponds to about twice the amount of the fed-in $NH_3$-gas stream.

After the precipitation is completed, the temperature in the precipitation tank $C_2$ of 60° C., is held for approximately another 30 minutes and the solution is then cooled down to about room temperature. After another 30 minutes, the precipitate suspended in liquid from tank $C_2$ is filtered in the filter $F_1$. The remaining residual moisture in the precipitate is $\leq 15\%$. The amount of uranium and plutonium remaining in the filtrate is $\leq 0.9\%$ of the original amount.

The precipitate obtained, which has a green-olive color and an average crystal size of about 40 to 60 μm, is subsequently dried in a conventional drying section D in a vacuum at temperatures of about 100° C. The powder produced is calcined in a furnace $C_3$ for about 4 hours at about 500° C. and subsequently for 2 hours at about 650° C. in an argon-hydrogen atmosphere.

After the calcining process, oxidation of the powder cooled down to 50°–70° C. with air takes place to an oxygen/metal ratio of about 2.16 $(U/Pu)O_{2.16}$.

The mixed-U/Pu oxide powder is free-flowing and can be sintered and has the following properties:

| Surface; BET: | $(m^2/g)$ | 7 to 12 |
|---|---|---|
| Bulk density: | $(g/cm^3)$ | 1.8 to 2.2 |
| Shaken-down density: | $(g/cm^3)$ | 2.3 to 2.8 |

| Grain size distribution, in at least 50% of the whole powder mass. | (μm) | 15 to 25 |
|---|---|---|

The powder is ≧99.9-% soluble in 10 molar HNO₃ (without addition of HF).

If desired, a light-water reactor fuel may be produced by mixing the U/Pu oxide powder from furnace C3 with UO₂ from a supply tank, in mixer R2 followed by screening the mixture.

The further processing into usable nuclear fuels is accomplished, first, by pressing the mixed U/Pu oxide powder into the desired pellet shape at a pressure of 1.5 to 2 t/cm². These so-called blanks are then sintered at temperatures of about 1700° C. in an argon-hydrogen atmosphere and reach a density of up to 10.6 g/cm³. These sintered bodies are likewise better than 99.9% soluble in fluorine-free 10 m HNO₃. A check by means of α-radiography shows a completely homogeneous distribution of the plutonium in the uranium.

The demonstrated solubility of the uranium/plutonium oxide powder and the blanks made therefrom as well as the sintered pellet in nitric acid is of decisive importance in connection with plutonium processing. Thus, all the so-called blank and sinter scrap, which cannot be avoided in the manufacturing and further processing procedure, can be dissolved without difficulty and the resultant solution can be returned for further processing. This has the advantage that no powder need be diluted with dry-processed scrap. Therefore, the same uranium/plutonium oxide powder is always exactly obtained and the quality control, which must be very thorough in this area, is decisively facilitated.

It is further necessary to separate the decay products formed, expecially americium, after extended storage of PuO₂ powder. This also requires wet-chemistry procedures. With a solubility of less than 90% of the PuO₂ powder, for instance, exoxalate, in 10 m HNO₃, the good solubility of the (U/Pu)O₂-powder manufactured by the method described represents an important advantage.

The precipitate is a complex material containing the groups (NH₄), [(U/Pu)O₂] and (CO₃), (COO)₂ or (NH₂COO). These complexes may be represented by the general formula $$(NH_4)_{+n}[(U/Pu)O_2]^{2+}{}_m(X)^{2-}{}_l$$

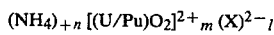

wherein X represents a member of the group consisting of CO₃, (COO)₂ and NH₂COO, and wherein n is a numeral from 0 to 6, m means one of the numbers one and two, and l is a numeral from 1 to 5.

The precipitate contains predominantly, under the preferred conditions of operation, material having the formula $$(NH_4)_n[(U/Pu)O_2](X)_3$$

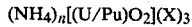

wherein X represents a member of the group consisting of CO₃, (COO)₂ and NH₂COO, and wherein n is a numeral from 0 to 4.

The precipitate with the carbonate anion, i.e. ammonium uranyl-plutonyl carbonate is the preferred form.

As a supplement, it should be mentioned that the (NH₄)₄.[(U/Pu)O₂].(CO₃)₃ can contain the substances (NH₄)₄[(U/Pu)O₂](CO₃).2H₂O as well as (NH₄)₆[(U/Pu)O₂]₂(CO₃)₅.2H₂O, which, however, have no effect on the further processing.

In conclusion, the advantages of the new method will be summarized briefly as follows:

1. An isotopic uranium/plutonium precipitate is precipitated with a low expenditure for process equipment.
2. All process parameters are easily controlled.
3. All product properties are highly reproducible.
4. The precipitate can be filtered easily and is crystalline.
5. The precipitate can be stored at room temperature in a dry atmosphere.
6. Calcining the precipitate yields a homogeneous (U/Pu)O₂-powder that can be sintered.
7. The powder and the fuel pellets made from the powder are soluble in HNO₃ preferably 10 M HNO₃, up to a uranium-plutonium ratio of 1:1 and preferably, 6:4 and in particular, 7.3, without, the introduction of special milling or sintering steps.
8. The applicability of the nuclear fuel manufactured in this manner includes thermal reactors as well as fast breeders.
9. The consistent, equally good solubility of such a nuclear fuel facilitates reprocessing and reduces the plutonium content in the waste.

There are claimed:

1. Method for the manufacture of uranium/plutonium oxide mixed crystals soluble in 10 molar nitric acid as a preliminary stage for the fabrication of sintered nuclear fuel bodies with uranium-and plutonium-containing materials, which comprises
    (a) oxidizing a mixture of uranyl nitrate and plutonium nitrate in aqueous solution to cause the plutonium to reach a stage of oxidation with a valence VI,
    (b) admixing the oxidized solution with an aqueous solution of a salt selected from the group consisting of ammonium carbonate, ammonium oxalate and ammonium carbamate and adjusting the pH of the admixture to 8.1–8.5 by adding NH₃ as well as CO₂ while maintaining a temperature of about 45° to 60° C. to precipitate an ammonium uranyl plutonyl carbonate, oxalate or carbamate depending on the use the particular salt selected from the group consisting of ammonium carbonate, ammonium oxalate and ammonium carbamate,
    (c) calcining the precipitate in a reducing atmosphere at about 300°–700° C. to produce a uranium-plutonium oxide, and
    (d) adjusting the uranium-plutonium oxide to a desired oxygen/metal ratio.

2. Method according to claim 1, wherein the salt is ammonium carbonate.

3. Method according to claim 1, wherein the salt is ammonium oxalate.

4. Method according to claim 1, wherein the salt is ammonium carbamate.

5. Method according to claim 1, wherein the plutonium content in the starting solution of uranyl nitrate and plutonium nitrate is an amount up to the amount of the uranium content.

6. Method according to claim 1, wherein the oxidation to the valence stage VI is achieved by heating the aqueous solution of uranyl nitrate and plutonium nitrate to at least 135° C. and concentrating the solution by evaporation.

7. Method according to claim 6, wherein the aqueous solution is heated at 135° to 150° C.

8. Method according to claim 1, wherein the calcined precipitate is oxidized in air to form a uranium-plutonium oxide with an oxygen-to-metal ratio of 2.1 to 2.2.

9. Method of producing compounds having the general formula $$(NH_4)^+_n [(U/Pu)O_2]^{2+}_m (X)_i^{2-}$$

wherein X represents a member of the group consisting of $CO_3$, $(COO)_2$ and $NH_2COO$, and wherein n is a numeral from 0 to 6, m means one of the numbers one and two, and i is a numeral from 1 to 5, which comprises oxidizing solution of uranyl nitrate and plutonium nitrate to cause the plutonium to be oxidized to valence VI, admixing the oxidized solution with a salt selected from the group consisting of ammonium carbonate, ammonium oxalate and ammonium carbamate to produce a precipitate having said formula, and separating said precipitate.

10. Method according to claim 9, wherein X is $CO_3$, and wherein the salt is ammonium carbonate.

11. Method according to claim 9, wherein X is $(COO)_2$, and wherein the salt is ammonium oxalate.

12. Method according to claim 9, wherein X is $NH_2COO$, and wherein the salt is ammonium carbamate.

13. Method of producing compounds having the formula $$(NH_4)_n[(U/Pu) O_2](X)_3$$

wherein X represents a member of the group consisting of $CO_3$, $(COO)_2$ and $NH_2COO$, and wherein n is a numeral from 0 to 4, which comprises oxidizing a solution of uranyl nitrate and plutonium nitrate to cause the plutonium to be oxidized to valence VI, admixing the oxidized solution with a salt selected from the group consisting of ammonium carbonate, ammonium oxalate and ammonium carbamate, maintaining a temperature of about 45° to 60° C. and a pH of 8.1 to 8.5 to produce a precipitate having said formula, and separating said precipitate.

14. Method according to claim 13, wherein X is $CO_3$, and wherein the salt is ammonium carbonate.

15. Method according to claim 13, wherein X is $(COO)_2$, and wherein the salt is ammonium oxalate.

16. Method according to claim 13, wherein X is $NH_2COO$, and wherein the salt is ammonium carbamate.

17. Method according to claim 13, wherein the precipitate is calcined and subsequently oxidized in air to form a uranium-plutonium oxide with an oxygen-to-metal ratio of 2.1 to 2.2.

* * * * *